April 24, 1956 R. H. CHERRY 2,743,167
INSTRUMENT FOR MEASURING CARBON MONOXIDE
IN OXYGEN BEARING ATMOSPHERE
Filed Oct. 10, 1950 3 Sheets-Sheet 1

Inventor
ROBERT H. CHERRY

April 24, 1956 R. H. CHERRY 2,743,167
INSTRUMENT FOR MEASURING CARBON MONOXIDE
IN OXYGEN BEARING ATMOSPHERE
Filed Oct. 10, 1950 3 Sheets-Sheet 2

Inventor
ROBERT H. CHERRY

April 24, 1956

R. H. CHERRY 2,743,167

INSTRUMENT FOR MEASURING CARBON MONOXIDE
IN OXYGEN BEARING ATMOSPHERE

Filed Oct. 10, 1950

Inventor
ROBERT H. CHERRY
By J. Schmitt
Walter S. Paul.
Attorneys

United States Patent Office 2,743,167
Patented Apr. 24, 1956

2,743,167

INSTRUMENT FOR MEASURING CARBON MONOXIDE IN OXYGEN BEARING ATMOSPHERE

Robert H. Cherry, Montgomery County, Pa., assignor, by mesne assignments, to the United States of America as represented by the Secretary of the Navy Application October 10, 1950, Serial No. 189,467

4 Claims. (Cl. 23—255)

This invention relates to a method and apparatus of measuring the concentration of carbon monoxide gas in an oxygen bearing atmosphere.

A preferred form of the invention is the parallel flow type in which one portion of the influent gas is made to pass over a catalyst and the other and substantially equal portion is made to pass over an adsorptive but non-catalytic material. In the catalytic cell, the heat of combustion of carbon monoxide is effective in raising the temperature of a pair of resistance thermometers; the other non-catalytic cell having another pair of like thermometers. The four resistance thermometers form the arms of a Wheatstone bridge network. Disproportionate deviations of the temperatures of the four arms from their initial values cause current to flow through a microammeter connected across the bridge points. In the combustion of monoxide, this current is proportional to the concentration of the carbon monoxide being oxidized.

Instruments presently in use and employing catalysts for the detection of combustible constituents in gas mixtures by utilizing temperature changes caused by liberation of heat of combustion have many defects and disadvantages. The presence of minute quantities of gasoline or water vapor in the gas, for instance, gives rise to errors in the analysis of the gas due to liberation of heat of adsorption or reaction with the catalyst. Variations in the ambient temperature and/or pressure may also cause errors in the analysis for the desired combustible component. The necessity for calibration and use in a virtually uncontaminated atmosphere imposes a limitation in many types of detection instruments due to the common presence of non-combustible impurities in the air in most locations where such an instrument may be used.

The particular use of this invention is to measure the concentration of carbon monoxide gas in aircraft cockpits due to incomplete combustion of engine fuel and/or to improper ventilation of gun compartments or the like. It is of particular use in the detection and evaluation of the quantity of carbon monoxide in submarine quarters where pure air is seldom available.

The general object of the invention is to overcome the defects common to present instruments used in the detection and measuring of gas constituents by providing improved methods and apparatus for measuring carbon monoxide contamination in such places where pure air is generally not available.

Another object of the invention is to provide an instrument in which the consequences of changes in ambient temperature are compensated.

Another object of the invention is to provide an instrument in which the presence of carbon dioxide, or of gasoline, water or other vapors in an atmosphere does not affect the quantitative measurement of the carbon monoxide component.

Another object is to provide an instrument which is readily portable and which may be easily calibrated at the site of the test without complicated computation or adjustment, and may be easily operated by one man while operating other test equipment and recording other test data.

The exact nature of this invention as well as other objects and advantages thereof will be readily apparent from consideration of the following specification relating to the annexed drawing in which.

Figure 1:
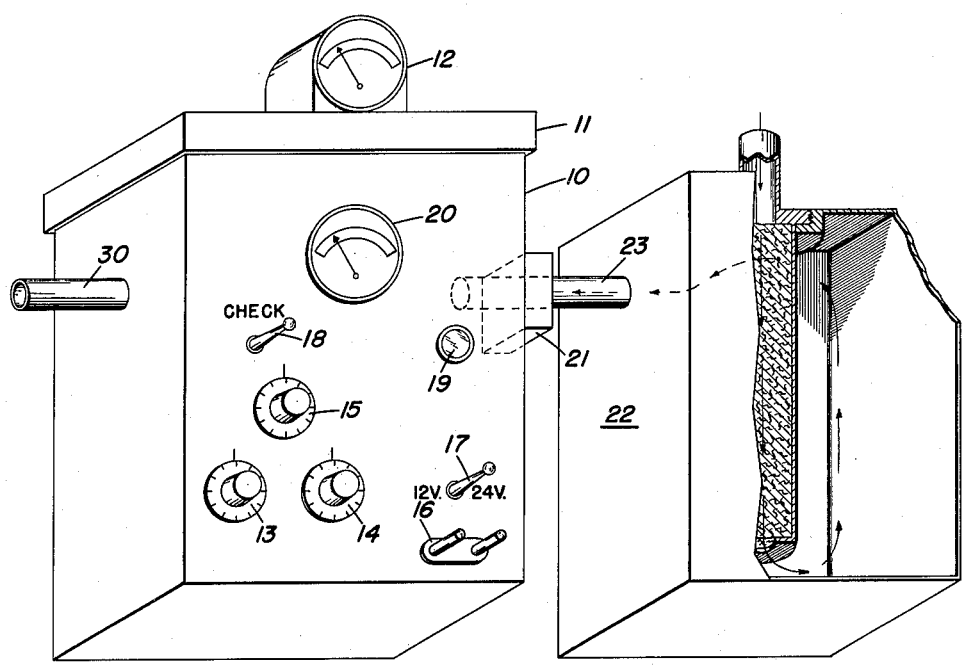
Fig. 1 is an isometric view of the exterior of the assembled instrument.

Referring more particularly to the drawings in which like numerals indicate like parts throughout the several figures, in Fig. 1 is shown a case 10 having a cover 11, microammeter 12, rheostats 13 and 14, potentiometer 15, current supply cable connection 16, switches 17 and 18, signal light 19, thermometer 20, and valve case 21. A conventional desiccator unit 22 is connected to the case 10 by its outlet tube 23.

Figure 2:
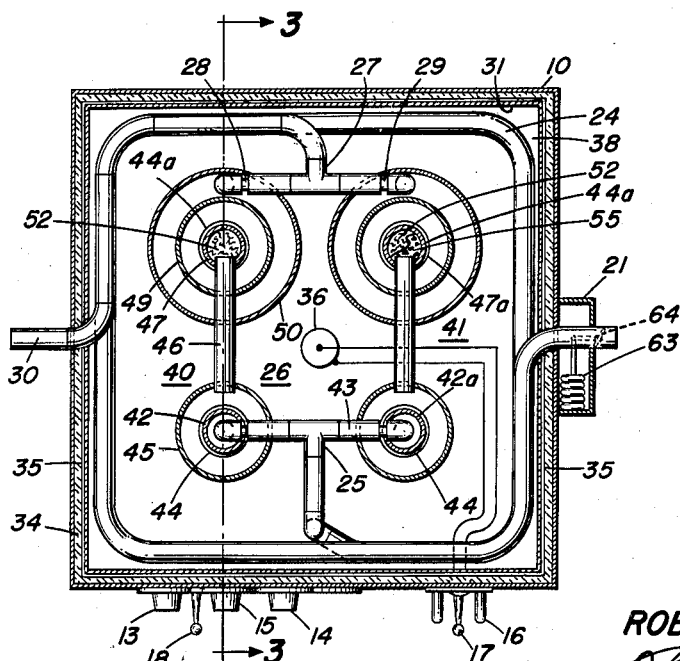
Fig. 2 is a horizontal sectional view of one embodiment of the invention.

In Figs. 1 and 2 is shown one embodiment of the invention in which coiled tube 24 is connected at one end to the valve case 21 and at the other to a T coupling 25 on the cell unit 26. A second T coupling 27 connects the restriction orifices 28 and 29 of the cell unit 26 to the gas outlet pipe 30. Coiled tube 24 is inserted in and separated by air space from box 31, which is in turn fitted into case 10 and separated therefrom by insulation 34. A heat element 35, composed of a 12 volt resistance element and a 24 volt resistance element, is wound around box 31 and is insulated from it by conventional means, such as mica or other heat resistant material. In circuit with the heater element 35 is switch 17, thermoswitch 36, signal light 19, and cable connection 16.

Figure 3:
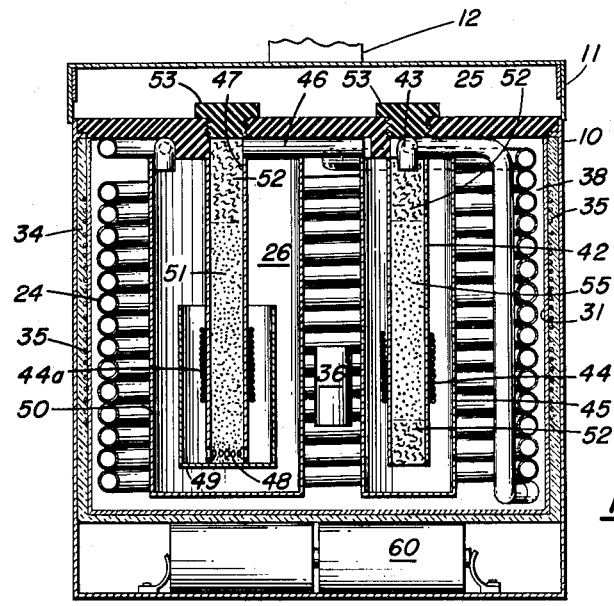
Fig. 3 is a view in section of the embodiment shown in Fig. 2 taken on line 3—3 of Fig. 2.

Cell unit 26 is constructed of two identical halves 40 and 41, one half being shown in section in Fig. 3 in which an inner cylinder 42 is connected to the T coupling 25 by tube 43 and has wound around its center section thermoresistor element 44. An outer shell 45 closed at the bottom surrounds inner cylinder 42 and reverses the flow of gas upwardly to the tube 46 which conducts the gas to the second inner cylinder 47 similarly wound with another thermoresistor element 44a. The second inner cylinder 47 is closed at the bottom and has ports 48, and is positioned in the center of the heat cup 49 which is in turn centered in the second outer shell 50. A reactive material 51, such as hopcalite, and a retainer 52 of spun glass or other inert and spongy materials are contained in cylinder 47. Cylinder 42 contains a material 55 having adsorptive but non-reactive characteristics, activated carbon for instance, and other retainers 52 above and below the carbon holds it in cylinder 42. Filler plugs 53 give access to the cylinders for recharging.

Cylinders 42a and 47a, in the cell unit half 41 are identical in construction with those above described, and have wound on them thermoresistors 44 and 44a in a like manner.

Valve case 21 contains an aneroid barometer 63 mechanically linked to valve 64 in such a way as to open the valve wider under a lowered atmospheric pressure.

Figure 7:
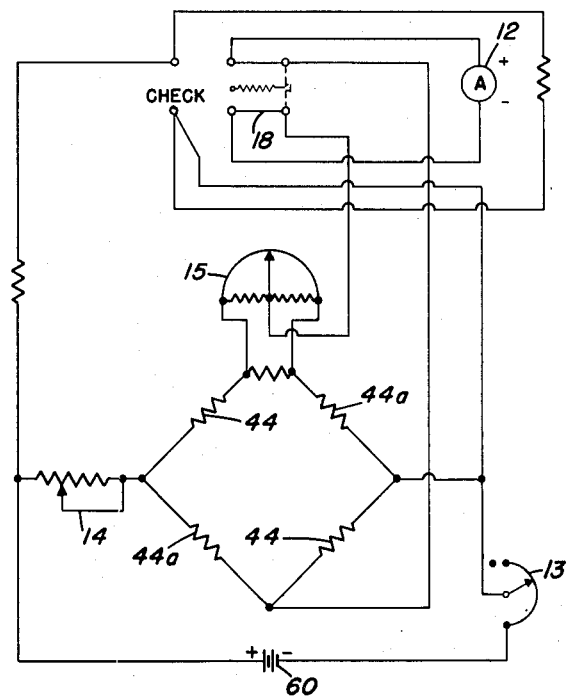
Fig. 7 is a schematic diagram of one electrical circuit of the invention.

Thermoresistors 44 and 44a are arranged in a Wheatstone bridge as shown in Fig. 7, the "hot" sides of the bridge being the thermoresistors wound upon the cells 47 and 47a. Battery 60 in the false bottom of case 10 supplies current for energizing the bridge in circuit with rheostats 13, 14, potentiometer 15, switch 18 and meter 12. Switch 18 is of the snap or spring return type and is only held momentarily in one position in the voltage standardizing operation and returns automatically to the closed position shown in Fig. 7.

Figure 4:
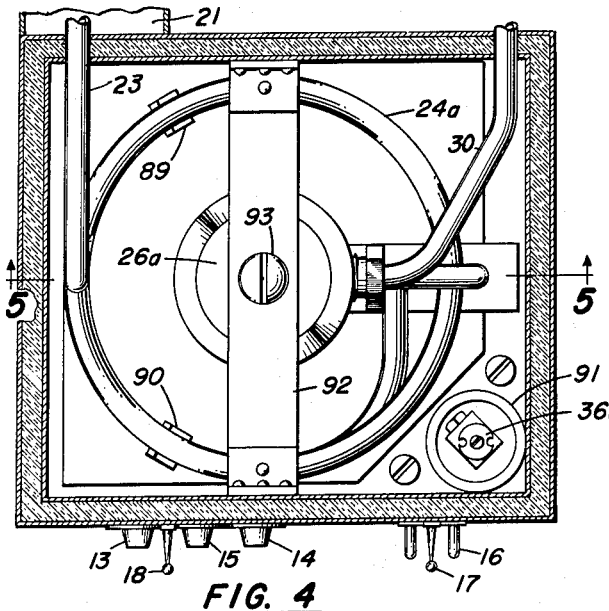
Fig. 4 is a horizontal view in section of a second embodiment of the invention.
Figure 5:
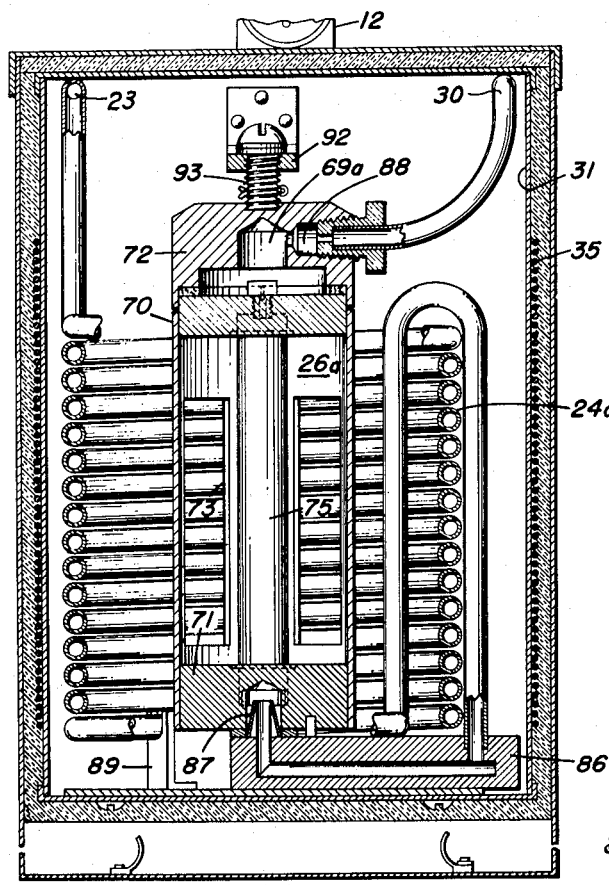
Fig. 5 is a view in section taken on line 5—5 of Fig. 4.
Figure 6:
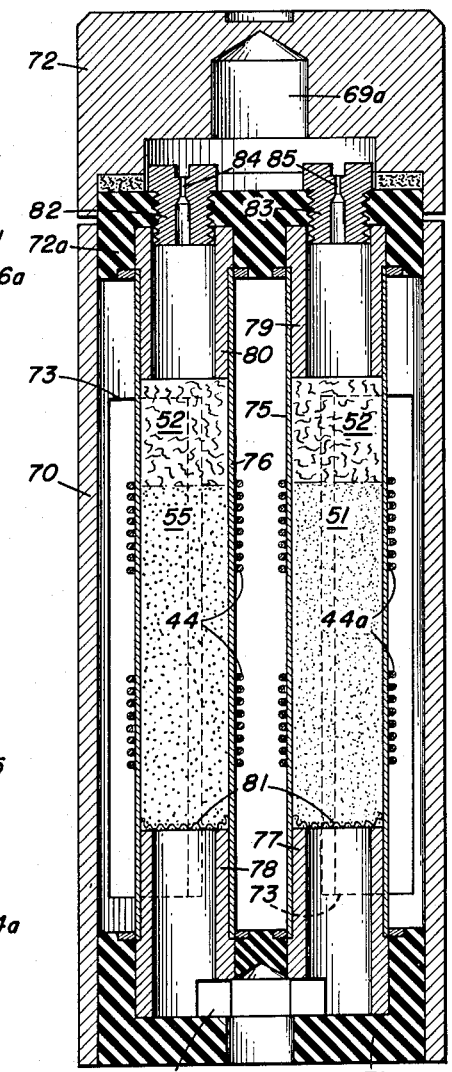
Fig. 6 is a detail view in section of the cell shown in Fig. 5 taken at right angles.

In Figs. 4 to 6 is shown a second embodiment of the invention. Adapted to be used in case 10, shown in Fig. 1, cell unit 26a has cell housing 70, cell base 71, cell cap 72, and ports 73. Cell tubes 75 and 76 are supported vertically on tube supports 77 and 78, respectively, and are secured by cell heads 79 and 80 cemented or otherwise fixed to the cell top 72a. Screens 81 in each of the cell tubes 75 and 76 act to restrain the movement of the material that is in each cell, placed there through the tube plugs 82 and 83 having restricted orifices 84 and 85. The coiled tube 24a is connected directly to the intake block 86 which has a tapered nipple 87 upon which cell base 71 fits. Cell base 71 has a branched opening 69 therein for the passage of gas to cell tubes 75 and 76. Cell cap 72 has an opening 69a therethrough connecting each of the cell tubes with conduit 88 which is in turn connected with the outlet tube 30. Brackets 89 and 90 support the cell unit 26a and coiled tube 24a within the inner box 31. In one corner of the box 31, a thermoswitch 36a is enclosed in tube 91, and is connected in circuit with the heater element 35 wound around the box 31 as shown in Fig. 3.

Bracket 92 secured at each end to inner box 31, has a bolt 93 threaded therethrough for holding the cell unit 26a snugly on the tapered nipple 87.

Cell tube 75 is filled with a reactive material in the same manner as is inner cylinder 47 of the first embodiment of the invention shown in Figs. 2 and 3, and cell tube 76 contains the non-catalytic but adsorptive material that is used in the cylinder 42. It will be therefore seen that the two embodiments of the invention operate in like manner, having for their differences the separate constructions and arrangements of their parts with the advantages that will be shown later. Cell tube 75 has wound around it two thermoresistor elements 44a and cell tube 76 has two thermoresistors 44, the four elements forming the legs of the Wheatstone bridge as shown in Fig. 7.

Figure 8:
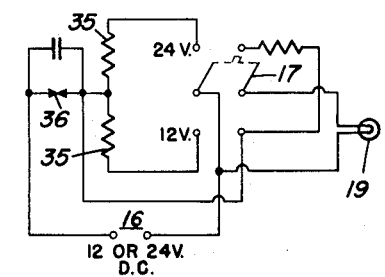
Fig. 8 is a schematic diagram of a second electrical circuit of the invention.

Fig. 8 shows the circuit for heating and controlling the temperature of the assembled instrument for the purpose to be described later.

In operation, the instrument in either of its embodiments is connected by the gas outlet pipe 30 to a source of vacuum, and by the cable connection 16 to a current supply, such as an aircraft's battery. As most aircraft have either a 12 or 24 volt current supply, one of the heater elements 35 may be energized by either voltage through the switch 17 which connects the heater of appropriate resistance in the circuit. After a period of warm-up, the coiled tube 24 or 24a and the cell unit 26 or 26a will reach a predetermined degree of temperature desired, as determined by the setting of the thermoswitch 36 or 36a, and as indicated by the cessation of illumination of the signal light 19 in the conventional manner. The vacuum pulled at the outlet pipe 30 should be approximately 3 inches of mercury, and generally this vacuum is available in aircraft power plants. By adjustment of the restriction outlets 28, 29, or 84, 85, the flow through each half of the cell unit 26 or 26a may be adjusted to optimum values. The aneroid barometer 63 acts to vary the suction as a function of altitude in order that the rate of gas flow be varied to cause constant mass of gas to pass through the cells per unit time.

With air moving through the cell unit during the warm-up period, the indicating meter 12 is adjusted to zero by the potentiometer 15 and the bridge circuit input voltage is adjusted to the correct operating value. Then a carbon monoxide air mixture of known CO concentration is passed through the desiccator and the cell unit at the desired rate by either pressure applied at the intake of the desiccator or by suction applied at the outlet pipe 30. After calibration to the known CO percentage of the mixture by adjusting variable resistance 14 if necessary, the instrument is ready for use, and a length of tubing may be attached between the desiccator intake and the point of gas sampling, such as the cockpit of the aircraft or the gun compartment.

The resistance thermometer windings, or thermoresistors, are wound on the outside surfaces of the thin-walled metal tubes which form the cylinders or tubes for containing the catalyst and the adsorbent materials. Hence, all or substantially all of the heat liberated within the tubes by combustion of the CO is effective in causing the thermoresistor temperatures to change, except for the sensible heat lost in the effluent gas. The use of metal tubes effects rapid heat distribution over the windings. The arrangement of the embodiment shown in Figs. 2 and 3 is described as the "thermal block" system and has the advantage of resulting in relatively high thermal efficiency. The embodiment shown in Figs. 4, 5, and 6 has the advantage of reaching operating temperature more readily, and has fewer parts and a slightly less resistance to gas flow.

Preheating the influent gas to the temperature of the cell, by passing the gas through the coiled tube, and maintaining the temperature of the gas above the highest ambient temperature likely to be encountered, are important features in providing zero stability and constancy of catalytic and adsorption characteristics.

In operating the thermometric bridge, it is energized at a predetermined voltage, and periodic adjustments must be made to keep the voltage at the proper value. Such adjustments in voltage are not required frequently unless the instrument is subjected to frequent changes in temperature. The adjustment of the bridge voltage is accomplished simply by closing switch 18 to the position marked "Check" in Fig. 7 and adjusting rheostat 13 until the indicating meter registers full scale (0.05 percent CO) deflection. Switch 18 automatically returns by spring action to the normal operating position shown in Fig. 7.

The unbalance current from the thermometric bridge is dependent upon: (a) the temperature difference between the hot and cold thermometers; (b) the voltage applied to the bridge; (c) the initial resistance and temperature coefficient of resistance of the thermometers; and (d), the resistance of the meter used to measure the unbalance current.

While the operation of the instrument is not dependent upon any critical temperature, it has been found that maintenance of the thermometric cell at a constant temperature at or above the highest ambient temperature to be encountered aids materially in eliminating undesirable zero shift and varying activity of the hopcalite or other catalyst used. It has also been found necessary to preheat the influent gas to the temperature of the thermometric cell to avoid temperature differences not due to combustion of the carbon monoxide. The coiled tube is adequate for this purpose and its length may be varied according to the difference between ambient temperature and the desired operating temperature.

The parallel flow of this instrument makes it necessary that the flow through the reference cell and through the catalyst cell be approximately equal but adjustable to compensate for differences in cell construction. This is readily done by changing either one or both restriction orifices 28 and 29, or 84 and 85, which when once adjusted for a given cell should not require further attention if the same type of catalyst and same absorptive material are used for replacement.

It should be understood, of course, that the foregoing disclosure relates to only two preferred embodiments of

What is claimed is:

1. An apparatus for measuring the carbon monoxide concentration in a carbon monoxide air atmosphere comprising a case, intake and outlet conduits in said case, an elongated heat exchanger conduit connected to said intake conduit, a pair of branch conduits connected at one end to said heat exchanger conduit and to said outlet at the other end, a catalyst for converting carbon monoxide to carbon dioxide in one branch conduit, an agent for adsorbing carbon dioxide in the other branch conduit, a Wheatstone bridge circuit of resistors, the hot resistors of which are positioned in the branch conduit associated with the catalyst, the cold resistors of which are positioned in the branch conduit associated with the adsorptive agent, means external to said heat exchanger for maintaining the temperature of said branch conduits and heat exchanger prior to induction of carbon monoxide into said apparatus at a uniform value greater than ambient temperature, and indicating means mounted on said case for measuring the unbalance of resistance in said Wheatstone bridge circuit, the outlet end of each branch conduit having a removable restriction orifice therein whereby the flow through said branch conduits may be equalized.

2. An apparatus for measuring the carbon monoxide concentration in an air atmosphere comprising a case, an intake conduit in said case, a heat exchanger conduit connected in said case to said inlet conduit, a pair of branch conduits connected to said heat exchanger conduit, an outlet conduit in said case, a removable restriction nozzle connected between said outlet conduit and the outlet end of each branch conduit, a gas adsorbent material having catalytic properties to convert carbon monoxide to carbon dioxide in one branch circuit, a gas adsorbent material inactive for conversion of carbon monoxide to carbon dioxide in the other branch circuit, a Wheatstone bridge circuit of resistors, the hot resistors of which are positioned on the one branch conduit associated with the catalyst and the cold resistors of which one positioned on the other branch conduit, means for subjecting the contents of said casing to a constant heat flow whereby the material in said other branch conduit is held at an approximately constant temperature, and indicating means for measuring the unbalance of resistance in said Wheatstone bridge circuit.

3. An apparatus for measuring the carbon monoxide concentration in an air atmosphere, comprising a case, inlet and outlet conduits in said case, a heat exchanger conduit connected in said case to said inlet conduit, a pair of cell tubes in said case having inlet and outlet ends, a tubular connection between the case outlet conduit and the outlet ends of said cell tubes, a block forming an enclosure for the inlet ends of said tubes and having a single inlet opening therethrough communicating with said cell tube inlet ends, a separable connector between said inlet opening and heat exchanger including a tapered nipple connected to said heat exchanger and normally seated against the wall edges of said opening, constructed and arranged for adjustment to block inlet openings of varied size, means for holding the parts of said separable connector in coengagement, and means for heating the interior of said case.

4. The apparatus as defined in cliam 3 including a removable restriction nozzle in the connection between the outlet end of each tube and the outlet of the casing conduit.

References Cited in the file of this patent

UNITED STATES PATENTS

| | | |
|---|---|---|
| 970,923 | Hinman | Sept. 20, 1910 |
| 1,416,361 | Lamb et al. | May 16, 1922 |
| 1,578,666 | Katz | Mar. 30, 1926 |
| 1,681,047 | Porter | Aug. 14, 1928 |
| 1,974,498 | Lewis | Sept. 25, 1934 |
| 1,992,747 | Gilliland et al. | Feb. 26, 1935 |
| 2,037,409 | Duvander | Apr. 14, 1936 |
| 2,114,401 | Price | Apr. 19, 1938 |
| 2,393,362 | Gerhold | Jan. 22, 1946 |
| 2,458,610 | Lindstrom | Jan. 18, 1949 |
| 2,531,592 | Yant et al. | Nov. 28, 1950 |
| 2,583,930 | Cotton | Jan. 29, 1952 |

FOREIGN PATENTS

| | | |
|---|---|---|
| 466,391 | Great Britain | May 27, 1937 |
| 645,252 | Great Britain | Oct. 25, 1950 |